United States Patent Office 2,949,413
Patented Aug. 16, 1960

2,949,413

PROCESS FOR PURIFYING PROPYLENE OXIDE

David E. Harmer and Earl T. Heckeroth, Midland, Mich., assignors to The Dow Chemical Company, Midland, Mich., a corporation of Delaware No Drawing. Filed Nov. 6, 1957, Ser. No. 694,744

7 Claims. (Cl. 204—154)

The invention concerns a process for purifying propylene oxide. It relates more particularly to a process for removing from propylene oxide, by-product chlorine-containing impurities incident to its manufacture and difficultly separable therefrom by distillation.

In the manufacture of propylene oxide by reaction of propylene chlorohydrin and an alkaline agent the propylene oxide is usually distilled from the reaction medium, then further purified, if needed, by fractional distillation to obtain propylene oxide of a commercial grade and suitable for a variety of purposes. However, the product frequently contains small amounts, e.g. 0.5 percent by weight expressed as chlorine, of chlorine-containing by-products impurities of unknown composition, which impurities are incident to its manufacture. These by-product chlorine-containing materials are difficult to separate from the propylene oxide by distillation methods since they appear to have boiling points similar to, or substantially the same as, that of propylene oxide or are azeotropically distilled, together with the propylene oxide, and add to the difficulties of manufacture in producing pure or substantially pure propylene oxide free from chlorine-containing impurities by the alkaline hydrolysis of propylene chlorohydrin.

It is a primary object of the invention to provide a process for removing by-product chlorine-containing impurities incident to its manufacture and difficultly separable by distillation from propylene oxide prepared from propylene chlorohydrin. Another object is to provide improvements in a process for making propylene oxide from propylene chlorohydrin. Other and related objects may appear from the following description of the invention.

According to the invention propylene oxide containing small amounts of by-product chlorine-containing impurities incident to its manufacture from propylene chlorohydrin, which impurities are difficultly separable from the propylene oxide by distillation can readily be obtained in a more pure form by subjecting the impure propylene oxide to ionizing radiations in amount sufficient to convert the chlorine-containing impurities into products boiling at temperatures above the boiling point of propylene oxide and thereafter subjecting the so-treated propylene oxide to distillation and separating propylene oxide of higher purity as distillate.

Ionizing radiation as the term is well understood in the art means high energy radiations such as photons or particles having an energy at least as great as 10,000 electron volts. Examples of such ionizing radiations are gamma rays, X-rays, accelerated electrons, neutrons, protons and the like. Convenient sources of ionizing radiation can be furnished by radio active isotopes or electron accelerators, e.g. cobalt-60 or Van de Graaff accelerators, atomic piles, fuel elements, etc.

The process can be carried out by irradiating the impure propylene oxide at temperatures between 0° and 150° C. and at atmospheric or superatmospheric pressure as required to maintain the main portion of the material being irradiated in liquid condition.

The ionizing radiation to be employed in the process can be of an intensity corresponding to form 10,000 to 500,000 rad per hour. A "rad" is defined as the amount of ionizing radiation absorbed by a material and is equivalent to 100 ergs per gram of the material.

The propylene oxide containing the by-product chlorine-containing impurities incident to its manufacture is preferably subjected to the ionizing radiation at intensities between 10,000 and 200,000 rad per hour, although intensities of up to 500,000 rad per hour or greater can be used, and for a total dose of from 0.3 to 20, preferably from 0.5 to 5, megarad.

It may be mentioned that best results are usually obtained by irradiating the impure propylene oxide at the lower intensities and for a total dose as herein specified, than is usually obtained at the higher intensities, although irradiation of the impure propylene oxide at intensities and for total doses throughout the ranges stated, result in a substantial lowering of the chlorine content of the propylene oxide recovered in practice of the invention.

The process can be carried out batchwise or in continuous manner, and is preferably carried out in an atmosphere such as air or nitrogen. Oxygen or an atmosphere having a high concentration of oxygen, substantially above that of air, is to be avoided since it inhibits the effect of the ionizing radiations.

In practice, the propylene oxide containing the by-product chlorine-containing impurities is subjected to ionizing radiations of an intensity and for a total dose within the ranges herein stated at temperatures between 0° and 150° C. and under a pressure sufficient to maintain the main portion of the material being irradiated in liquid condition, whereby the volatile chlorine-containing impurities are converted to a material which is non-volatile at the boiling point of propylene oxide and thereafter redistilling the propylene oxide.

The following examples illustrate ways in which the principle of the invention has been applied, but are not to be construed as limiting its scope.

EXAMPLE 1

A charge of 450 ml. of 1,2-propylene oxide containing 0.36 percent by weight of chlorine in the form of chlorine-containing impurities difficultly separable by distillation was sealed in a steel bomb. The bomb and its contents was subjected to radiation of gamma rays from cobalt-60 at a dose rate of 186,000 rad per hour for a total dose of $1.4 \times 10^6$ rad over a period of about 7.5 hours at a temperature of 100° C. Thereafter the bomb was cooled and opened. The irradiated 1,2-propylene oxide was removed. A charge of 100 ml. of the irradiated propylene oxide was placed in a distilling flask equipped with a 1-inch diameter by 18 inches long Vigreaux column and subjected to distillation. The distillate was collected as a first fraction consisting of 10 ml. and a second fraction consisting of 80 ml. The fractions of the distillate and the residue were analyzed for chlorine. The following results were obtained:

| Fraction No.: | Chlorine, percent |
|---|---|
| 1 | 0.03 |
| 2 | 0.03 |
| Residue | 0.89 |

For purpose of comparison a 100 ml. portion of the 1,2-propylene oxide starting material was subjected to distillation in the same manner. The second or 80 ml. fraction of the distillate was found to contain 0.25 percent by weight of chlorine.

EXAMPLE 2

In each of a series of experiments, a charge of 110 ml. of 1,2-propylene oxide containing 0.34 percent by weight of chlorine in the form of chlorine-containing impurities incident to its manufacture and similar to that employed in Example 1, was sealed in a glass bottle and subjected to gamma rays from cobalt-60 at room temperature in a field of intensity and for a total dose as stated in the following table. A 100 ml. portion of the irradiated 1,2-propylene oxide was distilled employing a procedure similar to that described in Example 1. The second or 80 ml. fraction of the distillate was analyzed for chlorine. Table I identifies the experiments and gives the total dose in megarads to which the 1,2-propylene oxide was subjected. The table also gives the percent by weight of chlorine in the distillate.

Table I

| Run No. | Irradiation Rate, Kilorad/hr. | Dose, Megarad | Chlorine in Distilled Product, Percent |
|---|---|---|---|
| 1 | 0.0 | None | 0.32 |
| 2 | 23.3 | 0.186 | 0.31 |
| 3 | 58.2 | 0.465 | 0.29 |
| 4 | 174 | 1.40 | 0.16 |
| 5 | 349 | 2.79 | 0.09 |

EXAMPLE 3

In each of a series of experiments, a charge of 1,2-propylene oxide similar to that employed in Example 1 and containing chlorine in the form of chlorine-containing impurities incident to its manufacture, was subjected to irradiation with gamma rays from cobalt-60 in a field of 186,000 rad per hour intensity for a total dose of 1.12 magarad and at a temperature as stated in the following table. A 100 ml. portion of the irradiated 1,2-propylene oxide was subjected to distillation employing a procedure similar to that employed in Example 1. The second or 80 ml. fraction of distillate was analyzed for chlorine. Table II identifies the experiments and gives the temperature and total dose to which the material was subjected. The table also gives the percent by weight of chlorine in the distillate.

Table II

| Run No. | Temp., °C. | Dose Megarad | Chlorine in Distilled Product, Percent |
|---|---|---|---|
| 1 | 0 | 1.12 | 0.22 |
| 2 | 20 | 1.12 | 0.19 |
| 3 | 35 | 1.12 | 0.14 |
| 4 | 100 | 1.12 | 0.06 |

EXAMPLE 4

A charge of 110 ml. of a batch of crude propylene oxide prepared by reaction of propylene chlorohydrin with an alkaline agent and ocntaining 0.87 percent by weight of chlorine in the form of by-product chlorine-containing impurities incident to its manufacture, was subjected to ionizing radiation of gamma rays from cobalt-60 at an intensity corresponding to 54,500 rad per hour for a total dose of 4.81 megarad. Thereafter, a 100 ml. portion of the irradiated material was subjected to distillation employing procedure as described in Example 1. The second or 80 ml. fraction of the distillate was analyzed and found to contain 0.08 percent by weight of chlorine.

EXAMPLE 5

A charge of 90 ml. of propylene oxide, prepared from propylene chlorohydrin and containing 0.174 percent by weight of chlorine in the form of by-product chlorine-containing impurities incident to its manufacture, was divided into three equal portions. One portion was retained as a control or blank. Another portion was placed in a Pyrex glass bottle and exposed to the action of gamma rays from a 10,000 curie cobalt-60 source at a distance of 19.5 centimeters from the center of the cobalt-60 source for a period of 5 hours. The third portion was exposed to rays from an AH4–100 w. ultraviolet lamp at a distance of 19.5 centimeters from the center of the lamp bulb for a period of 5 hours. Thereafter, the material was subjected to distillation employing a procedure as described in Example 1. The second fraction consisting of 24 ml. of distillate was analyzed for chlorine. The following results were obtained.

| Irradiation Kind | Chlorine in Distillate, Percent |
|---|---|
| None | 0.174 |
| Ultraviolet light | 0.172 |
| Gamma rays | 0.056 |

The gamma rays are effective for removing the chlorine-containing impurities.

We claim:

1. A process which comprises subjecting propylene oxide containing volatile by-product chlorine-containing impurities incident to its manufacture and difficultly separable therefrom by distillation to the effect of ionizing radiations corresponding to an intensity of at least 10,000 rad per hour for a total dose of at least 0.3 megarad at temperatures between 0° and 150° C. under a pressure sufficient to maintain the main portion of the material in liquid condition, whereby the volatile chlorine-containing by-product impurities therein are converted to a material which is non-volatile at the boiling point of propylene oxide, and thereafter redistilling the propylene oxide.

2. A process as claimed in claim 1, wherein the steps of irradiating the impure propylene oxide and redistilling the irradiated material is carried out in continuous manner.

3. A process as claimed in claim 1, wherein the impure propylene oxide is prepared by reaction of propylene chlorohydrin with an alkaline agent and the ionizing radiation is gamma rays from cobalt-60.

4. A process which comprises subjecting propylene oxide, containing volatile by-product chlorine-containing impurities incident to its manufacture from propylene chlorohydrin and difficultly separable by distillation, to the effect of ionizing radiations corresponding to an intensity of from 10,000 to 500,000 rad per hour for a total dose of from 0.3 to 20 megarad at temperatures between 0° and 150° C. under a pressure sufficient to maintain the main portion of the material in liquid condition, to convert the volatile chlorine-containing impurities to a material which is non-volatile at the boiling point of propylene oxide and thereafter redistilling the propylene oxide.

5. A process as claimed in claim 4, wherein the ionizing radiation corresponds to an intensity of from 10,000 to 200,000 rad per hour.

6. A process as claimed in claim 5, wherein the ionizing radiation is gamma rays from cobalt-60.

7. In a process for making propylene oxide, wherein propylene chlorohydrin is reacted with an alkaline agent and propylene oxide containing volatile by-product chlorine-containing impurities incident to its manufacture and difficultly separable therefrom by distillation is separated from the reaction mixture, the steps which consist in subjecting the impure propylene oxide to the effect of ionizing radiations corresponding to an intensity of at least 10,000 rad per hour for a total dose of at least 0.3 megarad at temperatures between 0° and 150° C. and under a pressure sufficient to maintain the main portion of the material in liquid condition, to convert the volatile chlorine-containing impurities to a material which is non-volatile at the boiling point of propylene oxide and redistilling the propylene oxide.

References Cited in the file of this patent

UNITED STATES PATENTS 2,622,060 Robeson et al. ......... Dec. 16, 1952

FOREIGN PATENTS 665,263 Great Britain ........... Jan. 23, 1952